US012749824B2

(12) United States Patent
Richardson et al.

(10) Patent No.: US 12,749,824 B2
(45) Date of Patent: Sep. 29, 2026

(54) BENT WIRE ANTENNA

(71) Applicant: Honeywell International Inc., Charlotte, NC (US)

(72) Inventors: Daniel Joseph Richardson, Brno (CZ); Petr Vítek, Brno (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 140 days.

(21) Appl. No.: 18/319,100

(22) Filed: May 17, 2023

(65) Prior Publication Data

US 2024/0388007 A1 Nov. 21, 2024

(51) Int. Cl.
*H01Q 1/36* (2006.01)
*H01Q 1/40* (2006.01)
*H01Q 9/22* (2006.01)
*H01Q 21/00* (2006.01)

(52) U.S. Cl.
CPC ......... *H01Q 21/0093* (2013.01); *H01Q 1/405* (2013.01)

(58) Field of Classification Search
CPC .... H01Q 21/0093; H01Q 21/26; H01Q 1/405; H01Q 1/42; H01Q 1/36; H01Q 1/362; H01Q 11/08; H01Q 11/04; H01Q 11/14; H01Q 25/001; H01Q 9/22; H01Q 9/44; H01Q 1/27; H01Q 21/24
See application file for complete search history.

(56) References Cited

U.S. PATENT DOCUMENTS

| | | | | |
|---|---|---|---|---|
| 5,678,201 | A | 10/1997 | Thill | |
| 6,784,850 | B2 * | 8/2004 | Morooka | H01Q 1/362 343/895 |
| 7,418,776 | B2 | 9/2008 | Pintos et al. | |
| 10,263,320 | B2 * | 4/2019 | Kourti | H01Q 1/273 |
| 10,916,837 | B2 * | 2/2021 | Greve | H01Q 1/362 |
| 11,784,401 | B1 * | 10/2023 | Greve | H01P 3/081 343/905 |
| 2003/0016185 | A1 * | 1/2003 | Morooka | H01Q 1/362 343/895 |
| 2012/0081259 | A1 * | 4/2012 | Regala | H01Q 21/26 343/797 |
| 2019/0020110 | A1 | 1/2019 | Paulotto et al. | |
| 2026/0081355 | A1 | 3/2026 | Richardson et al. | |

FOREIGN PATENT DOCUMENTS

| | | |
|---|---|---|
| CN | 106887719 A | 6/2017 |
| CN | 104953256 B | 1/2018 |
| CN | 208548456 U | 2/2019 |

(Continued)

OTHER PUBLICATIONS

WO-0124315-A1 translation (Year: 2001).*

(Continued)

*Primary Examiner* — Dameon E Levi
*Assistant Examiner* — Gurbir Singh
(74) *Attorney, Agent, or Firm* — Alston & Bird LLP

(57) ABSTRACT

An antenna defining a horizontal direction and a vertical direction is provided. The antenna can include a plurality of antenna wires. Each of the plurality of antenna wires can define at least three straight portions. At least one of the at least three straight portions can be noncoplanar with another one of the at least three straight portions.

17 Claims, 4 Drawing Sheets

(56) References Cited

FOREIGN PATENT DOCUMENTS

| | | | | | |
|---|---|---|---|---|---|
| CN | 109860991 | A | | 6/2019 | |
| CN | 216214084 | U | | 4/2022 | |
| CN | 115249886 | A | | 10/2022 | |
| CN | 218300238 | U | | 1/2023 | |
| EP | 0957533 | A1 | | 11/1999 | |
| GB | 2552828 | A | | 2/2018 | |
| JP | 3880864 | B2 | * | 2/2007 | ............. H01Q 1/366 |
| JP | 2009-194593 | A | | 8/2009 | |
| JP | 2010-166522 | A | | 7/2010 | |
| JP | 2005-051683 | A | | 2/2024 | |
| KR | 10-2010-0030644 | A | | 3/2010 | |
| KR | 20100030644 | A | * | 3/2010 | ........... H01Q 9/0428 |
| KR | 10-1557291 | B1 | | 10/2015 | |
| RU | 2146843 | C1 | | 3/2000 | |
| WO | WO-0124315 | A1 | * | 4/2001 | ............... H01Q 1/38 |
| WO | WO-2004088055 | A1 | * | 10/2004 | ........... H01Q 21/061 |
| WO | WO-2007094122 | A1 | * | 8/2007 | ........... H01Q 9/0457 |
| WO | 2011/141821 | A2 | | 11/2011 | |
| WO | 2022/227128 | A1 | | 11/2022 | |

OTHER PUBLICATIONS

JP 3880864 Translation (Year: 2025).*
WO-2004088055-A1 (Year: 2004).*
KR-20100030644-A (Year: 2010).*
KR-20100030644-A Translation (Year: 2010).*
WO-2007094122-A1 Translation (Year: 2007).*
WO-2004088055-A1 Translation (Year: 2004).*
KR-20100030644-A Translation (Year: 2001).*
Extended European Search Report Mailed on May 15, 2025 for EP Application No. 24223302, 12 page(s).
Lei Wang et al., "Broadband Circularly Polarized Cross-Dipole Antenna With Multiple Modes," IEEE, 8:66489-66494, (2020). [Retrieved from the Internet Sep. 16, 2024: URL: <https://ieeexplore.ieee.org/document/9037289>].

* cited by examiner

BENT WIRE ANTENNA

TECHNICAL FIELD

The present application relates generally to antennas. More specifically, the present application relates generally to a bent wire antenna.

BACKGROUND

An antenna is a device that converts electrical signals into electromagnetic waves and vice versa, which allows for the transmission and reception of information wirelessly. Antennas often receive or transmit electromagnetic waves to a satellite. Also, antennas are often coupled to a moveable machine, such as an aircraft, a seacraft, or a land vehicle. To maintain connection to the satellite, existing antennas are often configured to move (e.g., rotate and/or pivot) so that it remains pointed toward the satellite when coupled to a moveable machine. However, configuring the existing antennas to move may require various electronic and/or mechanical components that may add additional weight and complexity to the antennas. Additionally, configuring the existing antennas to move in response to the moveable machine moving may require programming and algorithms to determine and/or receive orientation information of the moveable machine to which it is attached, which adds additionally complexity.

The inventors have identified numerous deficiencies and problems with the existing technologies in this field. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In general, embodiments of the present disclosure provided herein include apparatuses to provide for improved antennas.

In various aspects, an antenna defines a horizontal direction and a vertical direction. The antenna can include a plurality of antenna wires. Each of the plurality of antenna wires can define at least three straight portions. At least one of the at least three straight portions can be noncoplanar with another one of the at least three straight portions.

In various examples, each of the plurality of antenna wires define a plurality of curved portions that connect adjacent straight portions.

In various examples, each of the plurality of curved portions have a bend radii that is less than 5 mm.

In various examples, each of the at least three straight portions of a corresponding antenna wire are monolithic with each other and with each of the plurality of curved portions of the corresponding antenna wire.

In various examples, at least a surface of each of the plurality of antenna wires include steel, copper, or both.

In various examples, each of the at least three straight portions of each of the plurality of antenna wires are noncoplanar with a non-adjacent straight portion of the corresponding antenna wire.

In various examples, the plurality of antenna wires are four discrete antenna wires that are each spaced approximately ninety degrees from each other around an axis that extends in the vertical direction.

In various examples, each of the plurality of antenna wires are configured substantially the same.

In various examples, each of the plurality of antenna wires include at least five straight portions that are each noncoplanar with each non-adjacent straight portion of the corresponding antenna wire.

In various examples, each of the plurality of antenna wires include at least seven straight portions that are each noncoplanar with each non-adjacent straight portion of the corresponding plurality of antenna wires.

In various aspects, a hemispheric antenna defines a horizontal direction and a vertical direction. The hemispheric antenna can include a radome top and a plurality of antenna wires positioned at least partially within the radome top. Each of the plurality of antenna wires can define at least three straight portions. At least one of the at least three straight portions can be noncoplanar with another one of the at least three straight portions.

In various examples, each of the plurality of antenna wires define a plurality of curved portions that connect adjacent straight portions.

In various examples, each of the plurality of curved portions have a bend radii that is less than 5 millimeters.

In various examples, each of the at least three straight portions of a corresponding antenna wire are monolithic with each other and with each of the plurality of curved portions of the corresponding antenna wire.

In various examples, at least a surface of each of the plurality of antenna wires includes steel, copper, or both.

In various examples, each of the at least three straight portions of each of the plurality of antenna wires are noncoplanar with a non-adjacent straight portion of the corresponding antenna wire.

In various examples, the plurality of antenna wires are four discrete antenna wires that are each spaced approximately ninety degrees from each other around an axis that extends in the vertical direction.

In various examples, each of the plurality of antenna wires are configured substantially the same.

In various examples, each of the plurality of antenna wires includes at least five straight portions that are each noncoplanar with each non-adjacent straight portion of the corresponding antenna wire.

In various examples, each of the plurality of antenna wires includes at least seven straight portions that are each noncoplanar with each non-adjacent straight portion of the corresponding plurality of antenna wires.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Figure 1:
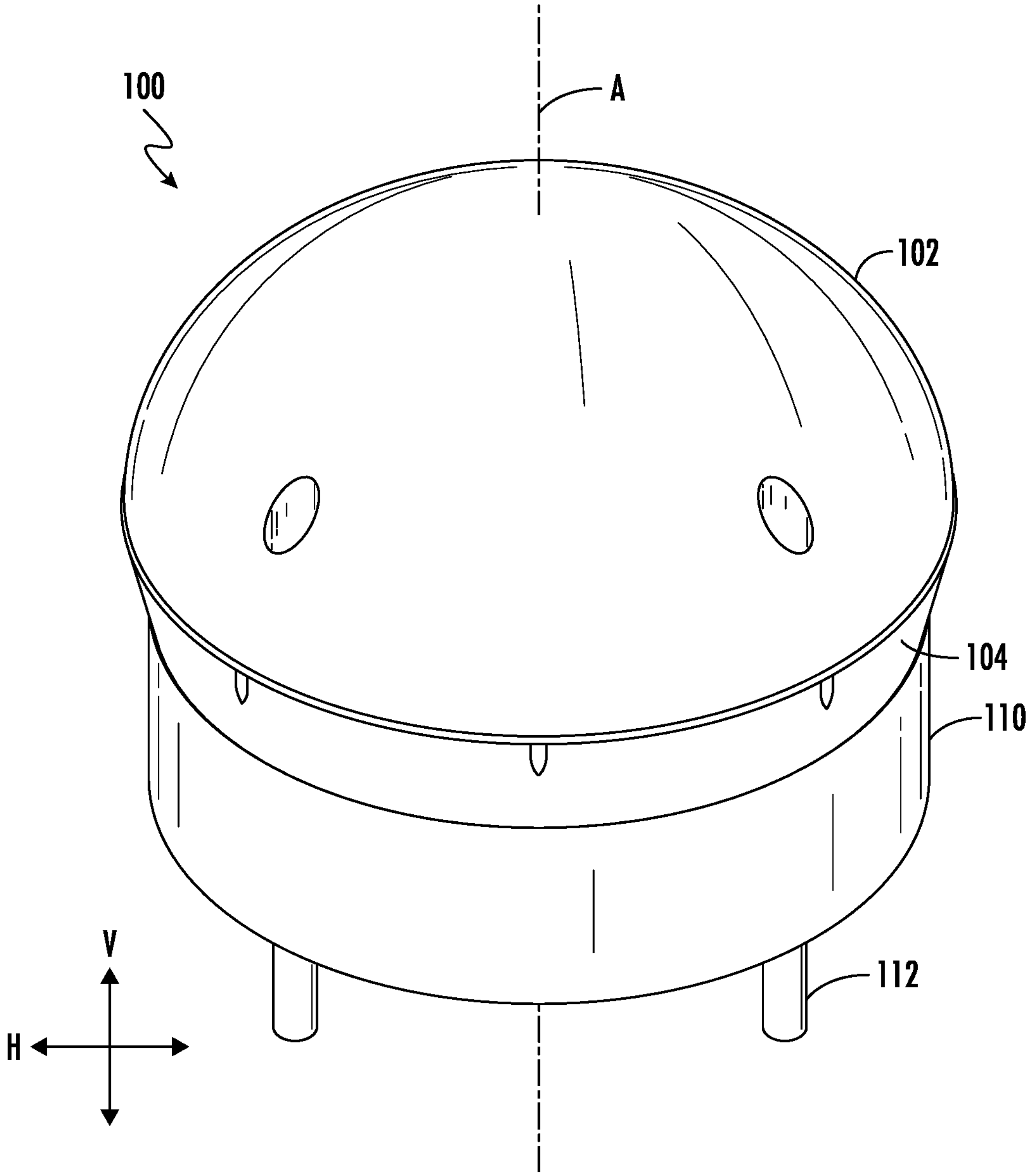

Having thus described certain example embodiments of the present disclosure in general terms above, non-limiting and non-exhaustive embodiments of the subject disclosure are described with reference to the following figures, which are not necessarily drawn to scale and wherein like reference numerals refer to like parts throughout the various views unless otherwise specified. The components illustrated in the figures may or may not be present in certain embodiments described herein. Some embodiments may include fewer (or more) components than those shown in the figures.

FIG. 1 provides a perspective view of an antenna, in accordance with an example embodiment.

Figure 2:
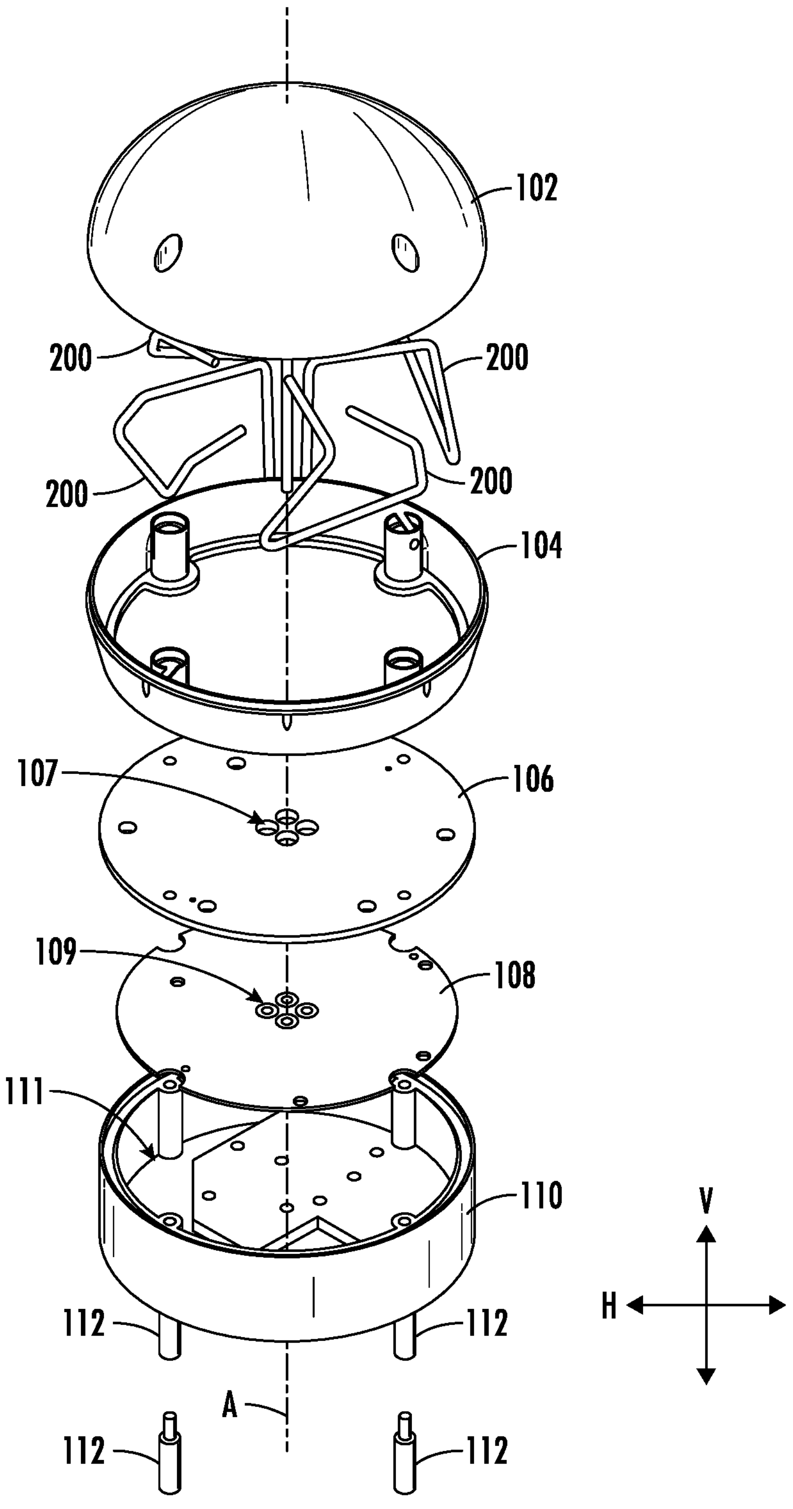

FIG. 2 provides an exploded view of the antenna of FIG. 1, in accordance with an example embodiment.

Figure 3:
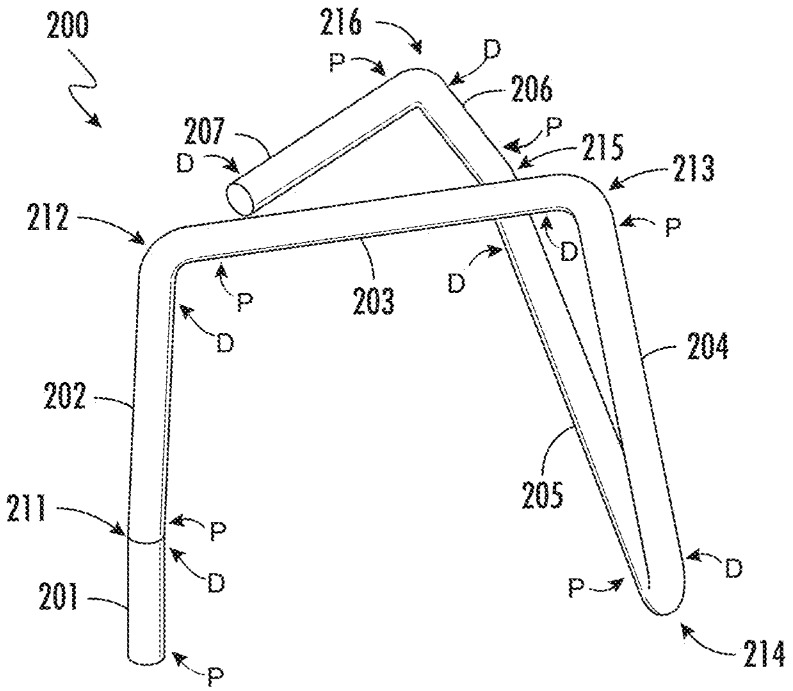

FIG. 3 provides a perspective view of a wire of the antenna of FIGS. 1 and 2, in accordance with an example embodiment.

Figure 4:
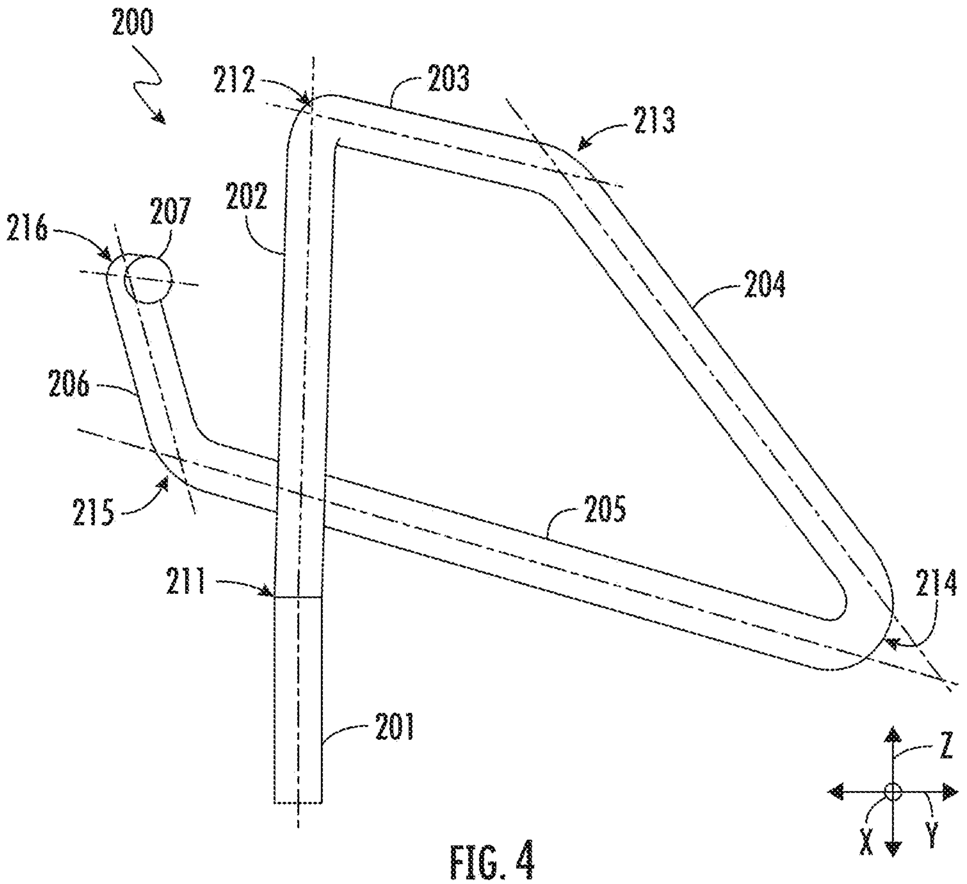

FIG. 4 provides a side view of the wire of FIG. 3, in accordance with an example embodiment.

Figure 5:
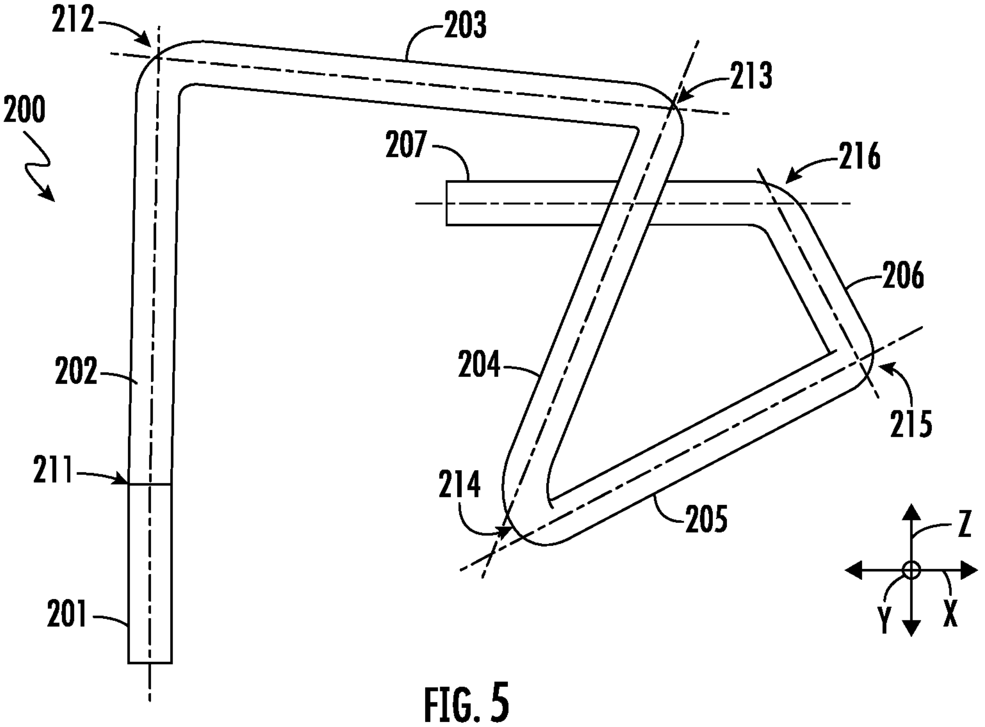

FIG. 5 provides a side view of the wire of FIG. 3, in accordance with an example embodiment.

Figure 6:
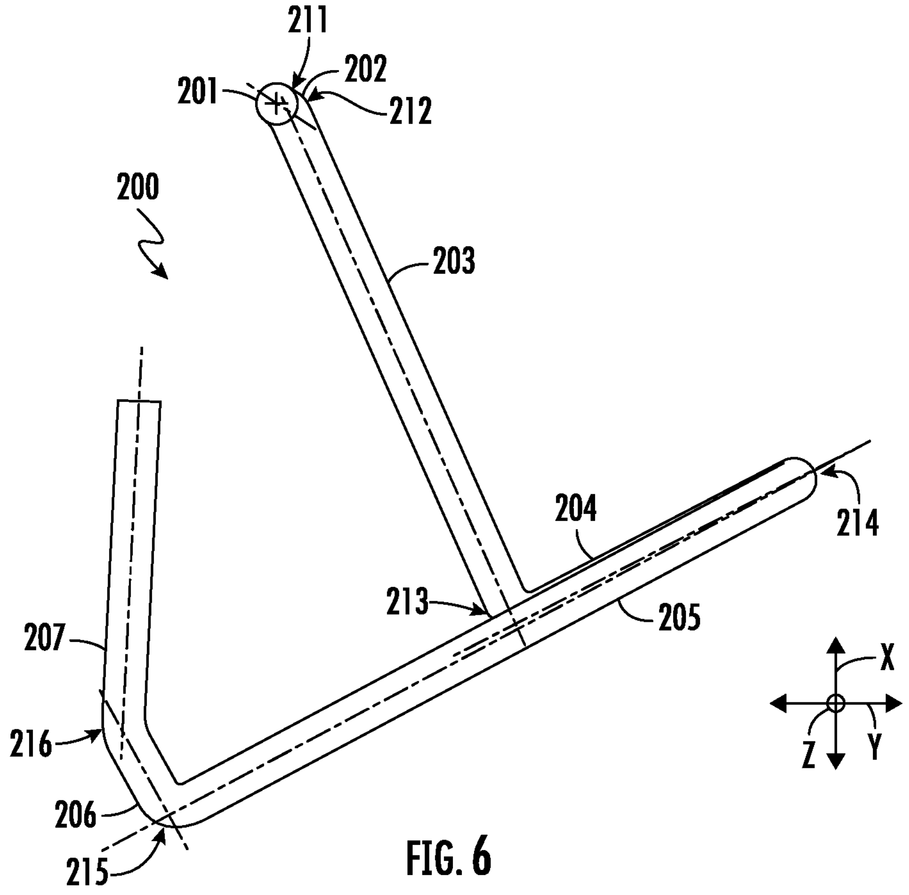

FIG. 6 provides a bottom view of the wire of FIG. 3, in accordance with an example embodiment.

DETAILED DESCRIPTION

One or more embodiments are now more fully described with reference to the accompanying drawings, wherein like reference numerals are used to refer to like elements throughout and in which some, but not all embodiments of the inventions are shown. In the following description, for purposes of explanation, numerous specific details are set forth in order to provide a thorough understanding of the various embodiments. It is evident, however, that the various embodiments can be practiced without these specific details. It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements.

As used herein, the term "exemplary" means serving as an example, instance, or illustration. Any aspect or design described herein as "exemplary" is not necessarily to be construed as preferred or advantageous over other aspects or designs. Rather, use of the word exemplary is intended to present concepts in a concrete fashion. In addition, while a particular feature may be disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the term "electrical communication" means that an electric current and/or electric signals are capable of making the connection between the areas specified.

As used herein, the terms "coupled," "fixed," "attached to," and the like refer to both direct coupling, fixing, or attaching, as well as indirect coupling, fixing, or attaching through one or more intermediate components or features, unless otherwise specified herein.

As used herein, the term "positioned directly on" refers to a first component being positioned on a second component such that they make contact. Similarly, as used herein, the term "positioned directly between" refers to a first component being positioned between a second component and a third component such that the first component makes contact with both the second component and the third component. In contrast, a first component that is "positioned between" a second component and a third component may or may not have contact with the second component and the third component. Additionally, a first component that is "positioned between" a second component and a third component is positioned such that there may be other intervening components between the second component and the third component other than the first component.

As used herein, terms of approximation, such as "approximately," "substantially," or "about," refer to being within manufacturing or engineering tolerances. For example, terms of approximation may refer to being withing a five percent margin of error.

Referring now to FIG. 1, a perspective view of an antenna 100 is provided, in accordance with an example embodiment. The antenna 100 can define a vertical direction V and a horizontal direction H. The antenna 100 can define a vertical axis A that extends through a center of the antenna 100.

The antenna 100 can be configured as a hemispheric antenna, such as an L-band hemispheric antenna. The antenna 100 can include a radome top 102 that is coupled, directly or indirectly, to a radome base 104. The radome base 104 can be coupled, directly or indirectly, to an antenna base 110. The antenna 100 can include a plurality of standoffs 112 that can facilitate the antenna 100 being coupled to a structure (e.g., a building), a vehicle (e.g., an aircraft, a seacraft, or a land vehicle), or equipment. Each standoff 112 can be coupled, directly or indirectly, to the antenna base 110.

Referring now to FIG. 2, an exploded view of the antenna 100 of FIG. 1 is provided, in accordance with an example embodiment. The antenna 100 can include a plurality of wires 200. Each of the plurality of wires 200 can be configured as antenna wires that are configured to receive and/or transmit electromagnetic waves. Each of the plurality of wires 200 can be positioned at different circumferential points around the axis A. In various examples, each of the plurality of wires 200 can be separate, discrete wires that are positioned substantially equidistant from adjacent wires 200. For example, and as depicted in FIG. 2, the antenna 100 includes four discrete wires 200 that are spaced approximately ninety degrees from each other (e.g., within a two degree tolerance).

Each of the plurality of wires 200 can be configured substantially the same (e.g., within manufacturing or engineering tolerances). For example, the shape and material may be the same. The pose of each of the wires 200 may be different, however. For example, and as depicted in FIG. 2, each of the wires 200 is rotated approximately ninety degrees relative to adjacent wires 200. Each of the wires 200 can comprise a conductive material, such as a metal, at least on a surface of the wires 200. For example, at least a surface of each of the wires 200 can comprise copper, steel, or both. For example, each of the wires 200 can comprise steel (e.g., a low-carbon steel) that is plated with copper. As will be discussed further, each of the wires 200 can have a bent wire configuration.

Each of the wires 200 can be positioned at least partially within the radome top 102 and at least partially within the radome base 104. For example, the radome top 102 can be shaped generally like a hemisphere. The radome top 102 may have a concave interior that each of the wires 200 can be at least partially positioned within. The radome top 102 can be manufactured from a material that is substantially transparent to radio frequency (RF) signals, such as plastic, such as polyethylene, and may cover and/or protect the wires 200 from the environment (e.g., rain, snow, etc.).

The radome base 104 can be generally cylindrical shaped and each of the wires 200 can be at least partially positioned within. The radome base 104 can be manufactured from a material that is substantially transparent to RF signals, such as plastic, such as polyethylene, and may protect the wires 200 from the environment. The radome base 104 may mechanically support the plurality of wires 200 and may prevent vibration from being transferred to the wires 200.

The antenna 100 can include a ground plane 106. The ground plane 106 can include a plurality of opening 107. Each of the wires 200 can be configured to extend through a corresponding opening 107 of the ground plane 106. The ground plane 106 may be configured as a ground connection for the RF source.

The antenna 100 can include a splitter 108. The splitter 108 can include a plurality of antenna connections 109. Each of the wires 200 can be coupled to a corresponding antenna connection 109 of the splitter 108. For example, each of the wires 200 can be soldered to the corresponding antenna connection 109 of the splitter 108.

As discussed, the antenna 100 can include an antenna base 110. The antenna base 110 can be generally cylindrical shaped and can define a cavity 111 within. The antenna 100 can include various electronic components, such as a transmitter and a receiver, which can be housed within the cavity 111 of the antenna base 110. Each of the wires 200 can be in electrical communication with the transmitter and/or the receiver. For example, each of the wires 200 can be in electrical communication with the transmitter and/or the receiver through a corresponding antenna connection 109 of the splitter 108.

Referring now to FIG. 3, a perspective view of a wire 200 of the antenna 100 of FIGS. 1 and 2 is provided, according to an example embodiment. As discussed, the wire 200 can include steel, such as a low-carbon steel, and/or copper. For example, the wire 200 can be a steel wire that is plated with copper. In various examples, including the example of FIG. 3, the diameter of the wire 200 is at least 3 millimeters (mm) and up to 3.4 mm, such as approximately 3.2 mm. However, the wire 200 can be any diameter, such as at least 2 mm and up to 6 mm.

The wire 200 can include a plurality of straight portions 201-207. For example, the wire 200 can include a first straight portion 201, a second straight portion 202, a third straight portion 203, a fourth straight portion 204, a fifth straight portion 205, a sixth straight portion 206, and a seventh straight portion 207. As used herein, the term "straight portion" refers to a length of the wire 200 that extends substantially in only one direction, such as within five degrees, such as within three degrees, such as within one degree of the only one direction. Each straight portion 201-207 may define a proximal end P and a distal end D. At least one straight portion 201 may have a proximal end P that is positioned at least partially within the radome base 104.

As discussed, the wire 200 can have a bent wire configuration such that the wire 200 includes a plurality of curved portions 211-216. For example, the wire 200 can include a first curved portion 211, a second curved portion 212, a third curved portion 213, a fourth curved portion 214, a fifth curved portion 215, and a sixth curved portion 216. Each of the curved portions 211-216 can be defined between and/or connect adjacent straight portions 201-207. For example, the first curved portion 211 can be defined between and/or connect a distal end D of the first straight portion 201 and a proximal end P of the second straight portion 202; the second curved portion 212 can be defined between and/or connect a distal end D of the second straight portion 202 and a proximal end P of the third straight portion 203, and so forth. As used herein, the term "curved portion" may refer to a portion of the wire 200 that has an internal bend radii that is less than 5 mm, such as less than 3 mm, such as less than 2 mm. In the example of FIG. 3, the bend radii of all of the plurality of curved portions 211-216 is approximately 1.4 mm. However, in various other examples, the bend radii may be different for at least one of the curved portions 211-216. For example, at least one of the curved portions 211-216 could have a bend radii that is at least 1.5 mm whereas at least another one of the curved portions 211-216 could have a bend radii that is less than 1.5 mm.

In various examples, and as depicted in FIG. 3, the wire 200, including the plurality of straight portions 201-207 and the plurality of curved portions 211-216, is continuous. Stated differently, the straight portions 201-207 and the curved portions 211-216 are monolithic. Each curved portion 211-216 can connect two adjacent straight portions 201-207. For example, the first curved portion 211 can connect the first straight portion 201 and the second straight portion 202, the second curved portion 212 can connect the second straight portion 202 and the third straight portion 203, and so forth.

Even though the wire 200 of FIG. 3 has seven straight portions 201-207 and six curved portions 211-216, it should be understood that the wire 200 could have less or more than seven straight portions and less or more than six curved portions. For example, the wire 200 may have three straight portions and two curved portions, or four straight portions and three curved portions, or five straight portions and three curved portions, and so forth.

Referring now to FIGS. 4-6, views of the wire 200 of FIG. 3 are provided, according to an example embodiment. The wire 200 can define an X direction, a Y direction, and a Z direction. The Z direction can be a vertical direction and the X direction and the Y direction can be horizontal directions. FIG. 4 depicts a side view of the wire 200, looking from the X direction. FIG. 5 depicts a side view of the wire 200, looking from the Y direction. FIG. 6 depicts a bottom view of the wire 200, looking from the Z direction.

In various examples, the wire 200 has a height in the Z direction of at least 35 mm and up to 55 mm, such as at least 40 mm and up to 50 mm, such as approximately 45 mm. The wire 200 can have a width in the X direction of at least 44 mm and up to 64 mm, such as at least 49 mm and up to 59 mm, such as approximately 54 mm. However, in various examples, the wire 200 can have a height in the Z direction of less than 35 mm or greater than 55 mm and/or a width in the X direction of less than 44 mm or greater than 65 mm.

In various examples, at least one of the straight portions 201-207 and another one of the straight portions 201-207 define a pair of skew lines. For example, a line defined by at least one of the straight portions 201-207 and a line defined by another one of the straight portions 201-207 may not intersect and may not be parallel. Stated differently, at least one of the straight portions 201-207 (e.g., one, two, three, four, five or more of the straight portions 201-207) and at least another straight portion 201-207 that is not adjacent to the at least one of the straight portions 201-207 are noncoplanar (i.e., not coplanar).

For example, the first straight portion 201 can be noncoplanar with at least one of the third straight portion 203, the fourth straight portion 204, the fifth straight portion 205, the sixth straight portion 206, and/or the seventh straight portion 207. Similarly, the second straight portion 202 can be noncoplanar with at least one of the fourth straight portion 204, the fifth straight portion 205, the sixth straight portion 206, and/or the seventh straight portion 207. Similarly, the third straight portion 203 can be noncoplanar with at least one of the fifth straight portion 205, the sixth straight portion 206, and/or the seventh straight portion 207. Similarly, the fourth straight portion 204 can be noncoplanar with at least one of the sixth straight portion 206, and/or the seventh straight portion 207. Similarly, the fifth straight portion 205 can be noncoplanar with the seventh straight portion 207.

In various examples, each of the straight portions 201-207 are noncoplanar with each non-adjacent straight portions 201-207. For example, the first straight portion 201 can be noncoplanar with each of the third straight portion 203, the fourth straight portion 204, the fifth straight portion 205, the sixth straight portion 206, and the seventh straight portion 207. The second straight portion 202 can be noncoplanar with each of the fourth straight portion 204, the fifth straight portion 205, the sixth straight portion 206, and the seventh straight portion 207. The third straight portion 203 can be noncoplanar with each of the first straight portion 201, the fifth straight portion 205, the sixth straight portion 206, and the seventh straight portion 207. The fourth straight portion 204 can be noncoplanar with each of the first straight portion 201, second straight portion 202, sixth straight portion 206, and seventh straight portion 207. The fifth straight portion 205 can be noncoplanar with each of the first straight portion 201, second straight portion 202, third straight portion 203, and seventh straight portion 207. The sixth straight portion 206 can be noncoplanar with each of the first straight portion 201, second straight portion 202, third straight portion 203, and fourth straight portion 204. The seventh straight portion 207 can be noncoplanar with each of the first straight portion 201, second straight portion 202, third straight portion 203, fourth straight portion 204, and fifth straight portion 205.

Various angles may be defined between adjacent straight portions. For example, and as depicted in FIG. 4, the second straight portion 202 is angled at approximately a one degree angle relative to the first straight portion 201 as viewed from the X direction and, as depicted in FIG. 5, the second straight portion 202 is angled at approximately a one degree angle relative to the first straight portion 201 as viewed from the Y direction. As yet another example, and as depicted in FIG. 4, the third straight portion 203 is angled at approximately a 140 degree angle relative to the fourth straight portion 204 as viewed from the X direction, as depicted in FIG. 5, the third straight portion 203 is angled at approximately a 75 degree angle relative to the fourth straight portion 204 as viewed from the Y direction, and as depicted in FIG. 6, the third straight portion 203 is angled at approximately a 86 degree angle relative to the fourth straight portion 204 as viewed from the Z direction. Resulting orientations of the straight portions 201-207 may result in the straight portions 201-207 sloping downward from a proximal end P to a distal end D relative to the horizontal direction, or sloping upward from a proximal end P to a distal end D relative to the horizontal direction. For example, and as depicted in the side views of FIGS. 4 and 5, the second straight portion 202, the fifth straight portion 205, the sixth straight portion 206, and the seventh straight portion 207 may slope upward from their proximal ends P to their distal ends D relative to the horizontal direction. The third straight portion 203 and the fourth straight portion 204 may slope downward from their proximal ends P to their distal ends D relative to the horizontal direction.

As discussed, the example of FIGS. 3-6 includes seven straight portions 201-207. Each of the straight portions 201-207 of the example of FIGS. 3-6 may define a pair of skew lines with all of the straight portions 201-207 that it is non-adjacent to. However, in various other examples, at least one of the straight portions 201-207 may be coplanar with a non-adjacent straight portion 201-207. For example, at least half, such as three quarters, of the plurality of straight portions 201-207 may be noncoplanar with at least one non-adjacent straight portion 201-207 whereas less than half, such as a quarter, of the plurality of straight portions 201-207 may be coplanar with at least one non-adjacent straight portion 201-207.

As will be appreciated, the antenna 100 of the present disclosure has various benefits. For example, the antenna may be coupled to a moveable machine. In various examples, the moveable machine is an aircraft. For example, the moveable machine can be an airplane, a rotorcraft, or an unmanned aerial vehicle (UAV). In various examples, the moveable machine is a watercraft. For example, the moveable machine can be a ship or a boat. In various examples, the moveable machine is a land vehicle.

When the antenna is coupled to a moveable machine, existing technologies may need to move, such as rotate and/or pivot, to maintain connection to a source of electromagnetic waves, such as a satellite. These existing technologies may be mechanically and/or electronically steered, rotated, or pivoted to maintain connection to the source of electromagnetic waves. The electronic and/or mechanical components required to steer, rotate, or pivot the existing technologies may increase the weight of the antenna and may incorporate complexity into the antenna. For example, these existing antennas may also require components to receive or sense the orientation of the aircraft so that the antenna can be repositioned appropriately.

The antenna 100 of the present disclosure, however, may not need to be moved or steered to maintain connection to a source of electromagnetic waves when coupled to a moveable machine. Instead, the antenna 100 of the present disclosure may be configured to allow each of the straight portions 201-207 to be positioned in any direction. Therefore, the overall pattern of the straight portions 201-207 of each of the wires 200 of the antenna 100 can be overlapped to form an overall pattern. This overall pattern that is formed collectively by the wires 200 allows the antenna 100 to radiate in all directions over the hemisphere and may have a half-power beam width of at least 180 degrees. Therefore, the antenna 100 may remain connected to the source of electromagnetic waves regardless of the orientation of the moveable machine.

CONCLUSION

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the appended claims below. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An antenna defining a horizontal direction and a vertical direction, the antenna comprising:

a plurality of antenna wires configured to receive or transmit electromagnetic waves, wherein:

each of the plurality of antenna wires define at least three straight portions, the at least three straight portions comprising a first straight portion, a second straight portion, and a third straight portion, the first straight portion is coplanar with the second straight portion such that they lie on a plane, the third straight portion is noncoplanar with the first straight portion and the second straight portion such that the third straight portion is angled at an angle that is greater than zero degrees and less than 180 degrees relative to the plane, each of the at least three straight portions define a proximal end and a distal end, the second straight portion slopes upward from the proximal end to the distal end relative to the horizontal direction, the third straight portion slopes downward from the proximal end to the distal end relative to the horizontal direction, each of the plurality of antenna wires define a plurality of curved portions that connect adjacent straight portions, a first angle is defined between the first straight portion and the second straight portion of the at least three straight portions, and a second angle that differs from the first angle is defined between the second straight portion and the third straight portion of the at least three straight portions, the second straight portion being adjacent to the first straight portion and the third straight portion.

2. A hemispheric antenna defining a horizontal direction and a vertical direction, the hemispheric antenna comprising:

a radome top; and a plurality of antenna wires positioned at least partially within the radome top and configured to receive or transmit electromagnetic waves, wherein:

each of the plurality of antenna wires define at least three straight portions, the at least three straight portions comprising a first straight portion, a second straight portion, and a third straight portion, the first straight portion is coplanar with the second straight portion such that they lie on a plane, the third straight portion is noncoplanar with the first straight portion and the second straight portion such that the third straight portion is angled at an angle that is greater than zero degrees and less than 180 degrees relative to the plane, each of the at least three straight portions define a proximal end and a distal end, the second straight portion slopes upward from the proximal end to the distal end relative to the horizontal direction, the third straight portion slopes downward from the proximal end to the distal end relative to the horizontal direction, each of the plurality of antenna wires define a plurality of curved portions that connect adjacent straight portions, a first angle is defined between the first straight portion and the second straight portion of the at least three straight portions, and a second angle that differs from the first angle is defined between the second straight portion and the third straight portion of the at least three straight portions, the second straight portion being adjacent to the first straight portion and the third straight portion.

3. The hemispheric antenna of claim 2, wherein each of the plurality of curved portions have a bend radii that is less than 5 millimeters.

4. The hemispheric antenna of claim 2, wherein each of the at least three straight portions of a corresponding antenna wire are monolithic with each other and with each of the plurality of curved portions of the corresponding antenna wire.

5. The hemispheric antenna of claim 2, wherein at least a surface of each of the plurality of antenna wires comprises steel, copper, or both.

6. The hemispheric antenna of claim 2, wherein each of the at least three straight portions of each of the plurality of antenna wires are noncoplanar with a non-adjacent straight portion of the corresponding antenna wire.

7. The hemispheric antenna of claim 2, wherein the plurality of antenna wires are four discrete antenna wires that are each spaced approximately ninety degrees from each other around an axis that extends in the vertical direction.

8. The hemispheric antenna of claim 2, wherein each of the plurality of antenna wires are configured substantially the same.

9. The hemispheric antenna of claim 2, wherein each of the plurality of antenna wires comprise at least five straight portions that are each noncoplanar with each non-adjacent straight portion of the corresponding antenna wire.

10. The hemispheric antenna of claim 2, wherein each of the plurality of antenna wires comprise at least five straight portions, wherein an angle is defined between adjacent straight portions, wherein each of the angles differ.

11. The hemispheric antenna of claim 10, wherein lengths of each of the at least five straight portions differ.

12. The hemispheric antenna of claim 2, wherein lengths of each of the at least three straight portions differ.

13. The hemispheric antenna of claim 2, wherein:

the hemispheric antenna defines a vertical axis that extends through a center of the hemispheric antenna, and the distal end of at least one of the at least three straight portions is positioned lower than its proximal end and closer to the vertical axis than its proximal end.

14. The hemispheric antenna of claim 2, further comprising:

a base that defines a cavity within; and a transmitter and a receiver positioned within the cavity of the base, wherein each of the plurality of antenna wires are in electrical communication with the transmitter and the receiver.

15. The hemispheric antenna of claim 2, wherein each of the plurality of antenna wires has a diameter that is at least 3 millimeters and up to 3.4 millimeters.

16. The hemispheric antenna of claim 15, each of the plurality of curved portions has a bend radii that is less than 5 millimeters.

17. The hemispheric antenna of claim 2, wherein each of the plurality of antenna wires has a height of at least 35 millimeters and up to 55 millimeters.

* * * * *